UNITED STATES PATENT OFFICE.

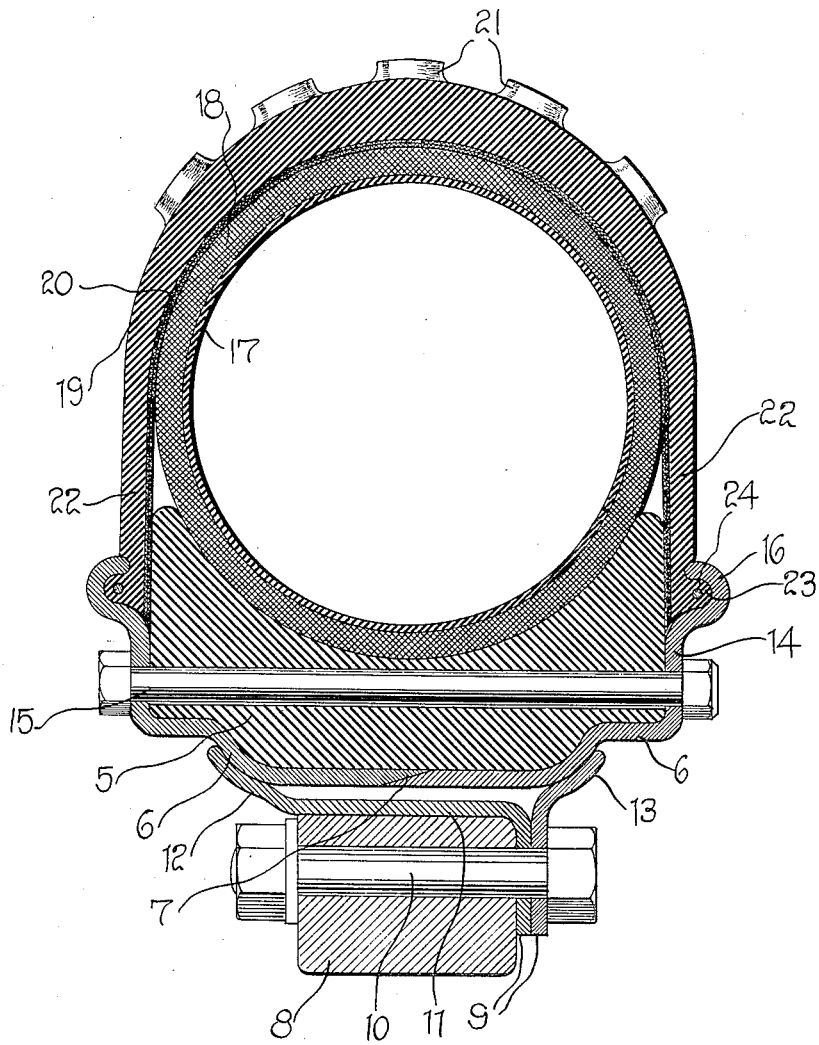

FORREST D. LANE, OF BISBEE, ARIZONA, ASSIGNOR TO BISBEE STRAIGHT MOTION ENGINE CO., OF BISBEE, ARIZONA, A CORPORATION OF ARIZONA.

WHEEL-TIRE.

1,126,232.      Specification of Letters Patent.      Patented Jan. 26, 1915.

Application filed February 21, 1914. Serial No. 820,278.

*To all whom it may concern:*

Be it known that I, FORREST D. LANE, citizen of the United States, residing a Bisbee, in the county of Cochise and State of Arizona, have invented certain new and useful Improvements in Wheel-Tires, of which the following is a specification, reference being had to the accompanying drawings.

This invention relates to wheel tires and more particularly to pneumatic tires such as are generally employed upon the wheels of automobiles and other motor vehicles, the invention having for its primary object to provide a tire of this character having a maximum of elasticity, and which may be very easily and quickly applied to the wheel felly.

The invention has for another of its objects to provide an annular cushioning member adapted to be arranged in a demountable rim, an inflatable tube seated upon said member, and a tread member disposed over said tube and having side walls extended upon the cushioning member and reinforced for engagement by the rim sections, whereby cutting of said tread member by the rim sections is obviated.

The invention has for a further object to generally improve and simplify the construction of devices of the above character whereby their manufacturing cost is reduced to a minimum while a high degree of operating efficiency and serviceability is obtained.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which I have illustrated a transverse section through a pneumatic tire constructed in accordance with the preferred embodiment of my invention, showing the same mounted upon the wheel felly.

The present invention is designed with a view to simplifying the construction and consequently decreasing the manufacturing cost of the tire shown and described in my prior application for patent, filed December 6, 1913, Serial No. 805,139, without, however, sacrificing any of the advantageous features of my original invention. With this end in view, I provide an annular cushioning member 5 preferably constructed of rubber and arranged upon the demountable rim sections 6. The contiguous edges of these rim sections are beveled to form a scarf joint 7.

8 indicates the wheel felly to one side of which plates 9 are rigidly fixed by means of a plurality of bolts 10. It will be understood that these plates are of continuous annular form and one of said plates extends over the outer face of the wheel felly as shown at 11 and is provided with an outwardly projecting curved flange or extension 12, which projects beyond the side face of the wheel felly. The other of the plates 9 is also formed with a similar oppositely projecting curved flange 13 and upon these flanges 12 and 13, the rim sections 6 are mounted, said sections being spaced from the felly engaging portion 11 of the plate 9 as shown. Each of the rim sections 6 is formed with an outwardly extending flange 14, and between these flanges the cushioning member 5 is seated upon said rim sections. The cushioning member and the flanges 14 are provided with coinciding openings to receive transverse bolts 15 whereby said rim sections are connected and the cushioning member properly held in place between the same. The outer edges of the flanges 14 are formed with the hook flanges 16, said beads being of substantially semi-circular cross sectional form and having their edges normally spaced from the side faces of the cushioning member 5.

The inner tube is of the ordinary construction and includes the soft rubber tube proper indicated at 17 and an outer canvas or other fabric casing 18.

19 designates the tread member or covering for the inner tube which is constructed of relatively hard rubber and is provided with an inner lining of fabric 20 for engagement with the fabric casing 18 of the inner tube, whereby any tendency of the tread member to move either longitudinally or transversely upon the tube is obviated. The tread member 19 is preferably provided upon its periphery with anti-skidding lugs or protuberances 21. This tread member is further formed with parallel side walls 22 upon the edges of which semi-cylindrical annular ribs 23 are formed, said ribs being reinforced by a central steel wire core 24. These ribs as clearly shown in the drawing, are adapted to be received in the hook flanges 16 formed upon the edges of the rim sections 6. The edges of these beads, when the bolts 15 are tightened in place, bind or bite into the walls 22 of the tread member. As these walls are provided with a backing wall in the form of the cushioning member 5, and the flanges 14 of the rim sections are clamped against the opposite sides of said cushioning member, liability of the walls or extensions 22 of the tread member being cut through by the hook flanges 16, is effectually obviated.

From the foregoing description taken in connection with the accompanying drawing, it is believed that the construction and several advantages of my improved wheel tire will be clearly and fully understood. By utilizing the cushioning member 5 in conjunction with the ordinary pneumatic tire, a maximum of resiliency is obtained while at the same time said cushioning member forms a yielding base against which the side walls of the tread member 19 engage, so that the inner tube will not be cut through by the rim sections when the wheel encounters boulders or other obstructions. It will of course be apparent that while I have above referred to a particular construction of the demountable rim, my invention in its essential particulars is by no means limited in its utility to such construction, but is applicable to various other types of wheel rims now in general use. It will be appreciated that by means of my invention, the durability of pneumatic wheel tires is greatly enhanced.

While I have shown and described the preferred construction and arrangement of the several parts employed, it will be understood that the invention is susceptible of considerable modification therein and I therefore reserve the privilege of resorting to all such legitimate changes as may be fairly embodied within the spirit and scope of the invention, as claimed.

Having thus described the invention, what is claimed is:

1. In a wheel tire, the combination with a rim consisting of two separable sections each provided with an inwardly extending hook flange upon its outer edge, of an annular rubber cushioning member arranged between said rim sections and projecting outwardly beyond the hook flanges, an inflatable tire seated upon said cushioning member, a tread member disposed over said tire, said tread member including side walls extending inwardly and engaged upon the opposite side faces of said cushioning member, and a plurality of bolts disposed through said cushioning member and rim sections to rigidly clamp the same together and engage the hook flanges with the side walls of said tread member, whereby the latter are securely held upon the side faces of the cushioning member against movement with respect thereto.

2. In a wheel tire, the combination with a rim consisting of two separable sections, each provided with an inturned hook flange upon its outer edge, of a cushioning member arranged upon said rim sections, said hook flanges being spaced from the opposite side faces of said member, an inflatable tire seated upon said cushioning member, a rubber tread member disposed upon said tire, said tread member being provided with parallel inwardly extending side walls for engagement upon the side faces of said cushioning member, each of said walls having an annular rib formed upon its edge, a reinforcing wire extending through said rib, and a plurality of bolts extending through the cushioning member and said rim sections to clamp the same together and engage the hook flanges with said annular ribs to secure the side walls of said tread member against the opposite faces of the cushioning member.

In testimony whereof I hereunto affix my signature in the presence of two witnesses.

FORREST D. LANE.

Witnesses:
M. CARLISLE LYDDANE,
D. W. GALL.